(12) United States Patent
Yang et al.

(10) Patent No.: US 9,690,723 B2
(45) Date of Patent: Jun. 27, 2017

(54) SEMICONDUCTOR DEVICE FOR PERFORMING TEST AND REPAIR OPERATIONS

(71) Applicant: SK hynix Inc., Icheon-si Gyeonggi-do (KR)

(72) Inventors: Hyung-Gyun Yang, Icheon-si (KR); Hyung-Dong Lee, Yongin-si (KR); Yong-Kee Kwon, Seoul (KR); Young-Suk Moon, Icheon-si (KR); Hong-Sik Kim, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 563 days.

(21) Appl. No.: 14/253,971

(22) Filed: Apr. 16, 2014

(65) Prior Publication Data
US 2014/0317332 A1    Oct. 23, 2014

(30) Foreign Application Priority Data

Apr. 22, 2013    (KR) .................... 10-2013-0043884

(51) Int. Cl.
*G06F 13/16*    (2006.01)
*G06F 13/30*    (2006.01)

(52) U.S. Cl.
CPC ...... *G06F 13/1673* (2013.01); *G06F 13/1668* (2013.01); *G06F 13/30* (2013.01)

(58) Field of Classification Search
None
See application file for complete search history.

(56) References Cited

U.S. PATENT DOCUMENTS

| | | | |
|---|---|---|---|
| 6,560,740 B1 | 5/2003 | Zuraski, Jr. et al. | |
| 2002/0031025 A1* | 3/2002 | Shimano | G11C 29/44 365/201 |
| 2005/0172180 A1 | 8/2005 | Damodaran et al. | |
| 2006/0112215 A1* | 5/2006 | Kim | G06F 12/0246 711/103 |
| 2007/0220216 A1* | 9/2007 | Oshima | G11C 16/12 711/154 |
| 2009/0037674 A1* | 2/2009 | Yoshikawa | G06F 15/7867 711/156 |

* cited by examiner

*Primary Examiner* — Idriss N Alrobaye
*Assistant Examiner* — Dayton Lewis-Taylor
(74) *Attorney, Agent, or Firm* — William Park & Associates Ltd.

(57) ABSTRACT

A semiconductor device may include: a storage unit configured to store program codes provided through control of a processor core; and a control unit configured to perform a control operation on a semiconductor memory device according to the program codes.

17 Claims, 10 Drawing Sheets

| 31 | | 3 | 2 | 1 | 0 |
|---|---|---|---|---|---|
| Reserved | | | F | C | S |

SEMICONDUCTOR DEVICE FOR PERFORMING TEST AND REPAIR OPERATIONS

CROSS-REFERENCE TO RELATED APPLICATIONS

The present application claims priority of Korean Patent Application No. 10-2013-0043884, filed on Apr. 22, 2013, which is incorporated herein by reference in its entirety.

BACKGROUND

1. Technical Field

Embodiments of the invention relate to a semiconductor device, and more particularly, to a semiconductor device capable of performing various operations, such as test and repair operations, on a semiconductor memory device which is mounted in a system.

2. Related Art

An independent test device has been used to test a semiconductor memory device. Test and repair operations are generally performed during a fabrication step.

The sizes of semiconductor memory devices have been significantly reduced. Thus, although no problems are discovered during a fabrication process of a semiconductor memory device, an error may occur while the semiconductor memory device is mounted in a system and then used.

SUMMARY

In an embodiment, a semiconductor device may include a storage unit configured to store program codes provided through control of a processor core. The semiconductor device may also include a control unit configured to perform a control operation on a semiconductor memory device according to the program codes.

In an embodiment, a semiconductor device may include a storage unit configured to store program codes provided through control of a processor core. In addition, the semiconductor device may also include a first control unit configured to control a semiconductor memory device according to the program codes. Further, the semiconductor device may also include a second control unit configured to control the semiconductor memory device to process a request from the processor core.

DETAILED DESCRIPTION

Various embodiments will be described below in more detail with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art. Throughout the disclosure, like reference numerals refer to like parts throughout the various figures and embodiments of the invention. There is a demand for a semiconductor device capable of performing test and repair operations on a semiconductor memory device, even while the semiconductor memory device is mounted in a system and then used.

Figure 1:
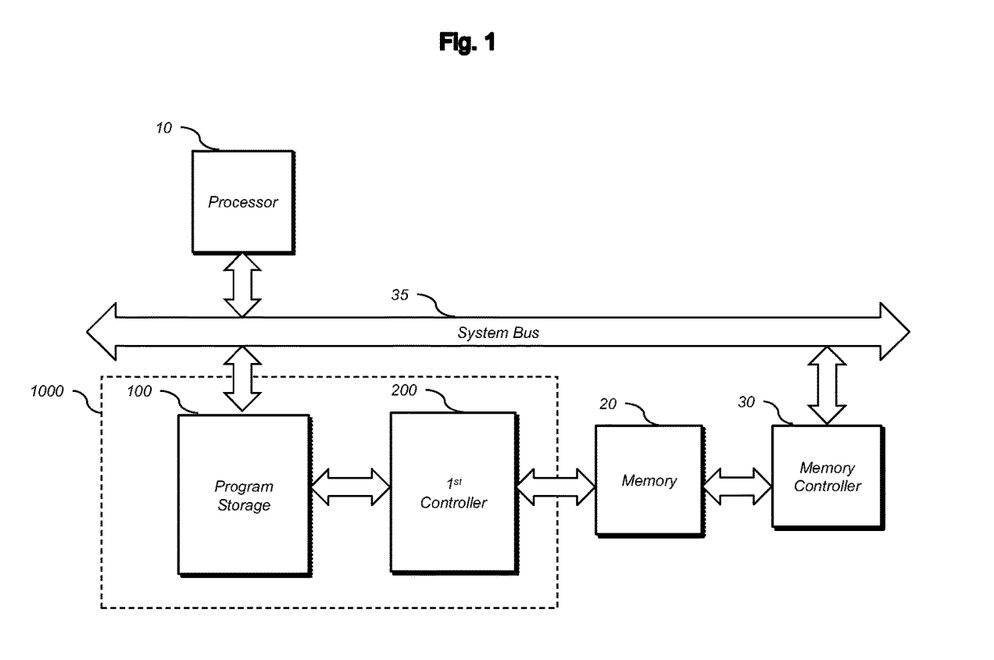
FIG. 1 is a block diagram of a system including a semiconductor device in accordance with an embodiment of the invention.

Referring to FIG. 1, a block diagram representation of an embodiment of a system including a semiconductor device 1000 is illustrated.

The semiconductor device 1000 may include a program storage 100 and a first controller 200. The system may further include a processor 10 and a memory device 20. The memory controller 30 may store data in the memory device 20 or read data from the memory device 20. The memory controller 30 may be embedded in the processor 10. The processor 10, the semiconductor device 1000, and the memory controller 30 may be electrically coupled to an external system bus 35.

The processor 10 may store a program code in the program storage 100. The program code storage operation of the processor 10 may be controlled through an application program which a user operates on an operating system.

For example, the user may provide a transmission command to the application program to allow a predetermined format of program code which may be analyzed by the first controller 200 to be stored in the program storage 100. The program code may be directly generated through an application program by a user, or already created and stored in another memory device (not illustrated). A program code described above may be stored in the program storage 100 through the control of the processor 10.

Figure 6:
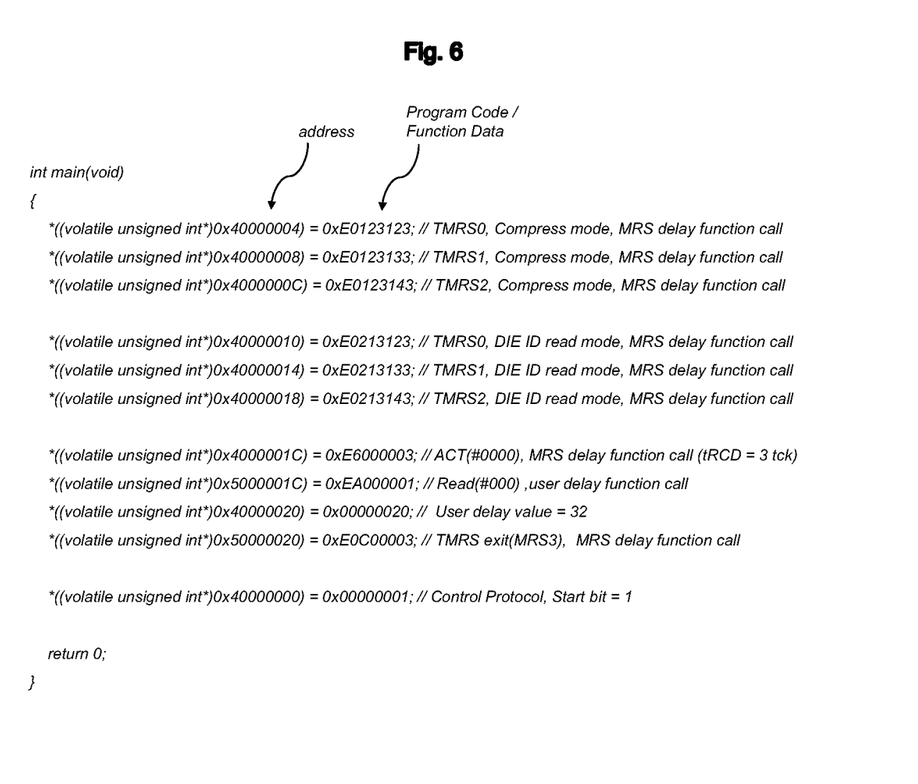
FIG. 6 illustrates an example of a C program code for programming information into the program storage.

FIG. 6 illustrates a C program code which is written by a user in order to store a program code. The C program code will be described below in detail.

The semiconductor device 1000 may be set to occupy addresses in a different region from a region of system addresses occupied by the memory device 20. The processor 10 may store a program code provided from an application program in the program storage 100. The processor may use the system addresses allocated to the semiconductor device 1000.

The first controller 200 may analyze the program code stored in the program storage 100, and control the memory device 20. The detailed configurations and operations of the program storage 100 and the first controller 200 will be described below.

Figure 2:
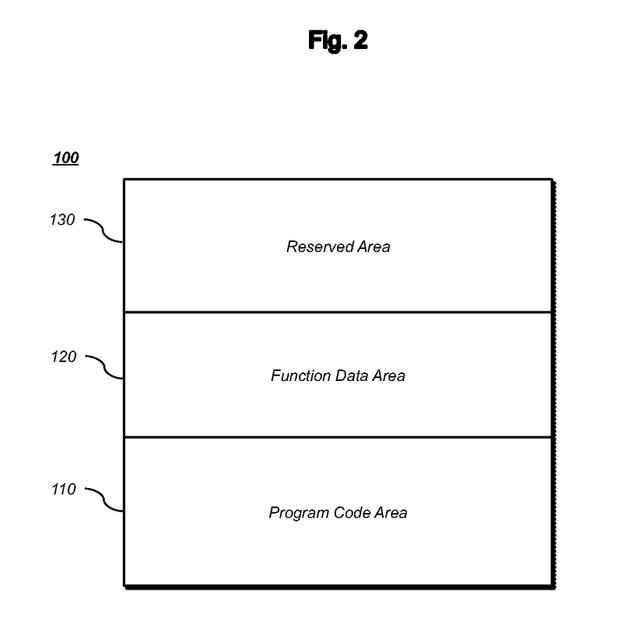
FIG. 2 illustrates a data structure of a program storage of FIG. 1.

Referring to FIG. 2, the program storage 100 may include a program code area 110, a function data area 120, and a reserved area 130. The program code area 110 may store a program code. The function data area 120 may store function data used in a program code. The reserved area 130 may include a reserved area for storing data read from the memory device 30.

The program code area 110 may store a series of program codes provided from the processor 10. The first controller 200 may read and analyze the series of program codes to determine an operation to be performed by the memory device 20. As a result, the first controller 200 may provide information such as command and address to the memory device 20. The program codes stored in the program code area 110 may have a data structure based on a main protocol or control protocol.

The function data area 120 may store data to be used by the first control unit 200 when a program code is executed. Addresses of the program code area 110 have a correlation with addresses of the function data area 120. When a predetermined first offset value is added to the address value of a program code stored in the program code area 110, an address of function data corresponding to the program code may then be obtained. When the program code area 110 includes function data required when a program code based on the main protocol is written, the function data may then be written to the function data area 120. The specific data structure of the function data is not illustrated. Nevertheless, the specific data structure of the function data may be easily corrected and changed by those skilled in the art depending on embodiments.

The reserved area 130 may include a space in which data outputted from the memory device 20 are stored when the first controller 200 controls the memory device 20 according to a program code. The address at which the data outputted from the memory device 20 is stored may have a correlation with the address of the program code. More specifically, when a predetermined second offset value is added to the address of the program code, the resultant value may become the address at which data outputted from the memory device 20 are stored. This result may be obtained by executing the program code.

Figure 3:
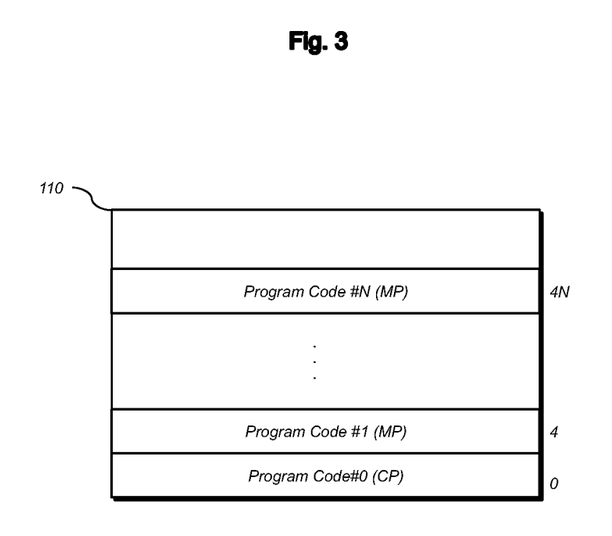
FIG. 3 illustrates an example in which program codes are stored in a program code area of FIG. 2.

Referring to FIG. 3, program codes 0 to 4N are stored in the program storage 110.

The program codes stored in the program storage 110 may have a data structure based on a control protocol CP or main protocol MP.

Figure 4:
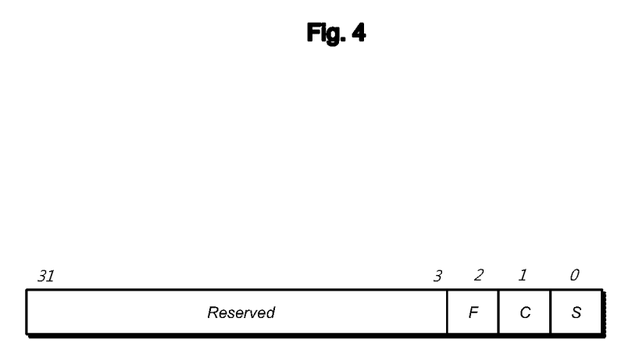
FIG. 4 illustrates a data structure of a program code based on a control protocol.

Referring to FIG. 4, a program code based on the control protocol may include a start bit S which issues an instruction to execute program codes based on the control protocol. The processor 10 may first store the program codes based on the main protocol, and then store the program code based on the control protocol.

The first controller 200 may observe whether the start bit of the program code based on the control protocol is activated. The first controller 200 may sequentially process the stored program codes based on the main protocol when the start bit is activated.

The first controller 200 may identify the program code based on the control protocol in different manners depending on embodiments. The program code based on the control protocol may be written to a specific address 0. Accordingly, the first controller 200 may observe whether the start bit at the zero-th address of the program storage 100 (zero-th bit of FIG. 4) becomes 1. In addition, the first controller 200 may sequentially process the program codes from a program code written at a fourth address of the program storage 100, when the start bit becomes 1. Addresses 3 and 2 are also illustrated in FIG. 4.

The processor 10 may first store the program codes based on the main protocol in the fourth to 4N-th addresses of the program storage 100. When data needs to be stored in the function data area 120, function data may be stored together. Consequently, the program code based on the control protocol may be finally inputted to the zero-th address such that the program codes are executed after the program code based on the control protocol is stored in the program storage 100.

The storage order of the program codes and the method for executing the program codes may differ depending on embodiments. The storage order and method for executing the program codes may be easily designed and changed by those skilled in the art.

Referring to FIG. 4, the program code based on the control protocol may also include a completion flag C, a flag F and the like. The completion flag C may indicate whether the execution of the program codes based on the main protocol are completed. The flag F may indicate whether the reserved area 130 has no space. The processor 10 may refer to the completion flag C of the program code based on the control protocol to determine whether the processing operation is completed.

Figure 5:
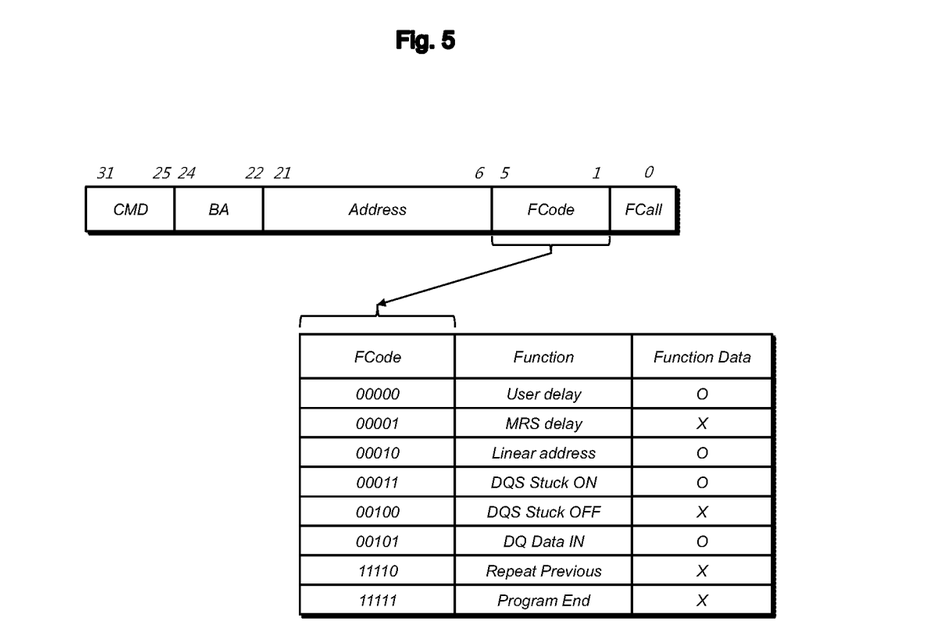
FIG. 5 illustrates a data structure of a program code based on a main protocol.

Referring to FIG. 5, the program code based on the main protocol may include a command field CMD, a bank address field BA, an address field Address, a function code field FCode, and a function call field FCall. Various numerals 0, 1, 5, 6, 21, 22, 24, 25, and 31 in relation to the FCall, FCode, Address, BA, and CMD are provided. Functions may include a user delay, MRS delay, Linear Address, DQS Stuck ON, DQS Stuck OFF, DQ Data IN, Repeat Previous, and Program End.

The first controller 200 may analyze the contents of the respective fields included in the main protocol. The first controller 200 may also determine an operation which is to be performed by the memory device 20. As a result, the first controller 200 may provide information such as command and address to the memory device 20.

The information stored in the command field may include a command to be provided to the memory device 20. The bank address field may include a bank address to be provided to the memory device 20. The address field may include an address to be provided to the memory device 20.

The command field, the bank address field, and the address field may be physically mapped one-to-one to corresponding pins of the memory device 20. In an embodiment, however, the command field, the bank address field, and the address field may not be mapped one-to-one. In an embodiment where the command field, the bank address field, and the address field are not mapped one-to-one, the first controller 200 may decode the data of the corresponding fields and provide the decoded data to the memory devices 20.

The function code field may indicate a function which is to be additionally performed by the first controller 200 using the above-described command and address, in addition to the operation of controlling the memory device 20. The function call field may indicate whether there is a function to call.

The function call field may be combined with the function code field. More specifically, the function code may be set to a specific value, thereby indicating that a function does not need to be called. In an instance where the function code may be set to a specific value, the function call field may not be used.

Referring to FIG. 5, a function code "00000" may indicate a delay function of delaying operation by a time designated by a user before a next program code is executed after a current program code is executed. As a result, the time designated by the user may be stored in function data corresponding to the program code. As described above, the function data may be stored in the function data area 120. In addition, the address at which the function data are stored may be associated with the address of the corresponding program code through a predetermined offset value.

A function code "00001" may indicate a delay function during an MRS control operation. When a program code includes the corresponding function code, the first controller 200 may delay the program code for a predetermined time, and then execute the next program code. In an embodiment, the delay time may be previously fixed, and function data may not be required.

A function code "00010" may indicate to use an address stored in function data, instead of using the bank address field and the address field to execute a command CMD.

A function code "00011" may indicate to fix a DQ strobe (DQS) signal of the memory device 20. In addition, a function code "00100" may indicate to not fix the DQS signal of the memory device 20. When the DQS signal is fixed, information on a level to fix the DQS signal may be provided through the function data. FIG. 5 also illustrates a function code "00100."

A function code "00101" may indicate to provide data included in the function data to the memory device 20.

A function code "11110" may indicate to execute a current program code again.

A function code "11111" may indicate to end the processing operation for the program code. Accordingly, the function code "11111" may be set in the last program code (for example, a program code #N illustrated in FIG. 3). When the function code "11111" is executed, the first controller 200 may set the completion flag C based on the control protocol at a high level. FIG. 5 Function Data is illustrated by an O and X.

Referring to FIG. 6, an example of a C program for storing program codes and function data in the program storage is illustrated. An embodiment may indicate a code to control the memory device 20 through TMRS input. The TMRS is an expanded MRS, and may be used for various control operations. The TMRS may be used as an operation of adjusting an internal voltage of the memory device, adjusting parameters of the memory device, a redundancy test, a compression test and the like. Various addresses such as *((volatile unsigned int*) 0x40000004) to *((volatile unsigned int*)) 0x40000000) are illustrated. In addition, various program codes/function data such as 0xE0123123;// TMRS0, Compress mode, MRS delay function call to 0x00000001;//Control Protocol, Start bit=1 are also illustrated.

A user may write and execute a corresponding code so as to store a program code and function data at a specific address of the program storage 100. When the program codes based on the main protocol and the function data corresponding to the program codes are written, the program code based on the control protocol, of which the start bit is activated, is finally inputted. Then, the control operation stored in the program storage 100 is started.

Figure 7:
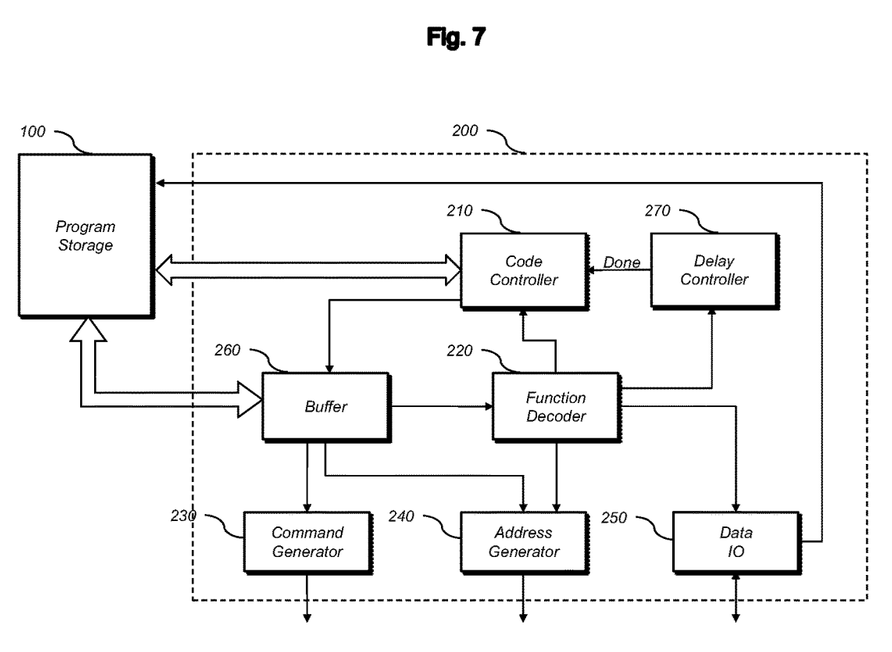
FIG. 7 is a block diagram of a first controller of FIG. 1.

Referring to FIG. 7, a block diagram of the first controller 200 of FIG. 1 is illustrated. The first controller 200 may include a code controller 210, a function decoder 220, a command generator 230, an address generator 240, a data input/output unit 250, a buffer 260, and a delay controller 270.

The code controller 210 may include a program counter (not illustrated) to indicate a program code to be read from the program storage 100. The code controller 210 may also set a current address value in the program counter to indicate a program code to execute.

The code controller 210 may monitor the program code based on the control protocol in the program storage 100. In addition, the code controller 210 may start to read a first program code (program code #1 of FIG. 3) based on the main protocol into the buffer 260, when the start bit represented by S of FIG. 4 is activated. In an embodiment, the current address value of the program counter of the code controller 210 may be set to 4.

In an embodiment, the program code based on the control protocol is stored at the zero-th address of the program storage 110. The start bit is then stored in the zero-th bit thereof. The program code based on the control protocol and the start bit are stored in the zero-th bit after all of the program codes based on the main protocol are written. Therefore, the code controller 210 may observe the change in value of the start bit at each clock. Moreover, the code controller may recognize whether a program code based on the control protocol, of which the start bit is activated, is inputted or not.

Then, the code controller 210 may determine an address of a program code to be read next according to the control of the function decoder 220 and the delay controller 270. Further, the code controller 210 may provide the address to the program storage 100.

The buffer 260 may temporarily store a program code to be currently processed and function data related to the program code.

The function decoder 220 may identify a function to perform by referring to the data of the function call field FCode and the function call field FCall in the program code. The function decoder 220 may also provide a control signal corresponding to the identified function to other components.

More specifically, when the function call field is zero and no function is performed, the function decoder 220 may control the code controller 210 such that the program counter indicates the address of the next program code. In an embodiment, the next address may be obtained by adding 4 to the current address.

When the function code is "00000," the function decoder 220 may control the delay controller 270 to delay the operation by the time indicated by the function data. The delay controller 270 may provide a "Done" signal to the code controller 210, when the delay time passes. Upon receipt of the "Done" signal, the code controller 210 may update the address value of the program counter into the address value of the next program code.

When the function code is "11110," the function decoder 220 may control the code controller 210 to equalize the address value of the program counter to the address value of the current program code. When the address value of the program counter is equivalent to the address value of the current program code, the current program code may be executed again.

When the function code is "00010," the function decoder 220 may control the address generator 240 to use the function data as an address instead of the address of the bank address field or the address field.

When the function code is "00011," the function decoder 220 may control the data input/output unit 250 by referring to the function data. The data input/output unit 250 may generate a fixed DQS signal according to the function data. The data input/output unit 250 may also provide the generated DQS signal to the memory device 20. When the function code is "00100," the function decoder 220 may control the data input/output unit 250 such that the DQS signal is not fixed.

When the function code is "00101," the function decoder 220 may refer to the function data and control the data input/output unit 250 to generate data to be inputted to the memory device.

The command generator 230 may generate a command to be provided to the memory device 20 by referring to the command field CMD of the program code (refer to FIG. 5). In an embodiment, the command field may be mapped one-to-one to the corresponding pins of the memory device 20. In an embodiment where the mapping relation may differ, the command generator 230 may decode information provided by the program storage 100. In addition, the command generator may generate a command to be provided to the memory device 20.

The address generator 240 may generate an address using the data provided to the bank address field BA, the address field Address, or the function data of the program code. The address generator 240 may generate the address according to the control of the function decoder 220, and then provide the generated address to the memory device 20. In an embodiment, the address data fields included in the bank address field, the address field, and the function data may be mapped one-to-one to the corresponding pins of the memory device 20. In an embodiment where the mapping relation differs, the address generator 240 may decode the information provided from the program storage 100, and provide an address to the memory device 20.

The data input/output unit 250 may provide the DQS signal or data signal to the memory device 20. The DQS signal or data signal may be generated through the function data provided by the function decoder 220. When a read command is provided to the memory device 20, the data input/output unit 250 may receive data provided from the memory device 20, and store the received data in the program storage 100. Accordingly, the received data may be stored in the reserved area 130 of the program storage 100. Further, the stored address may be associated with the address of the corresponding program code.

When the function decoder 220 commands delay based on the function data, the delay controller 270 may delay the operation by the time set in the function data. In addition, the delay controller 270 may then provide information on whether the delay is completed, to the code generator 210. When the function decoder 220 commands delay for a predetermined time, the delay controller 270 may delay operation by the predetermined time without referring to the function data. As a result, the delay controller 270 may then provide information on whether the delay is completed, to the code generator 210.

The delay controller 270 may include a counter (not illustrated) to delay the operation by a predetermined time or a time designated through the function data.

The delay function may be used when a predetermined delay time needs to be set between the respective program codes to control the memory device 20. The predetermined delay time may be set while satisfying the timing condition required for the operation of the memory device 20.

Using the above-described configuration, a user may store program codes for a test of the memory device 20 in the program storage 100, and execute the program codes. From this operation, the user may recognize the position of a cell, a word line, or a bit line of the memory device, in which an error occurs.

Recently, much attention has been paid to a memory device 20 including a program unit (for example, E-fuse array) which may be broken by a signal inputted to the memory device 20. Attention has also been paid to a fuse cut through laser. With the memory device 20, as input signals are provided to the memory device 20 in a specific order, a word line or bit line may be saved.

The semiconductor device in an embodiment may easily perform a repair operation through the program function, when a memory device including a program unit such as an E-fuse array is used together.

For example, a user may recognize information on a word line or bit line which is to be repaired, based on a test result. As a result, the user may determine the order of signals to be provided to the memory device to perform a repair operation. In addition, the user may then complete a group of program codes and function data. Such an operation may be performed by applying the program operation illustrated in FIG. 6.

The user may store the completed program codes and function data corresponding to the program codes in the program storage 100, and then execute the program codes. At the end of the operation, the user may perform an additional test operation for checking whether the repair operation was normally performed.

Figure 8:
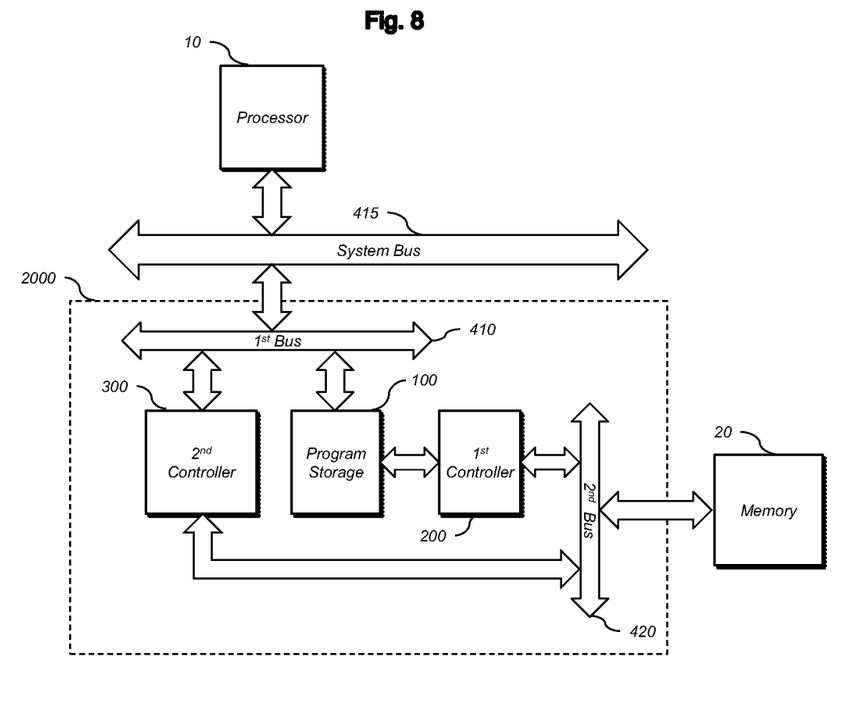
FIG. 8 is a block diagram of a system including a semiconductor device in accordance with an embodiment of the invention.

Referring to FIG. 8, a block diagram of a system including the semiconductor device 2000 in accordance with an embodiment is different from the above-described embodiment. More specifically, the semiconductor device 2000 includes a second controller 300 corresponding to the conventional memory controller 30. However, the configurations and operations of the program storage 100 and the first controller 200 are substantially the same as those of the above-described embodiment. Moreover, the configuration and operation of the second controller 300 are substantially the same as the conventional memory controller 30. Therefore, the detailed descriptions thereof are omitted herein.

The semiconductor device 2000 may further include a first bus 410 interfaced to an external system bus 415. The first bus 410 may also be interfaced to the program storage 100 and the second controller 300 inside the semiconductor device 2000.

The semiconductor device 2000 may further include a second bus 420 interfaced to the memory device 20. The second bus 420 may also be interfaced to the first controller 200 and the second controller 300 inside the semiconductor device 2000. The first bus 410 and the processor 10 may be electrically coupled to the external system bus 415.

In an embodiment, the semiconductor device 2000 and the memory device 20 occupy address areas which are distinguished from each other on the system.

Accordingly, when a signal deviating from the corresponding address area is provided to the system bus, the program storage 100 and the second controller 300 may set a port interfaced to the first bus 410 in a high impedance state. The port may be set in a high impedance state in order to prevent signal collision.

Similarly, when the first controller 200 or the second controller 300 does not operate, the first controller 200 or the second controller 300 may set a port interfaced to the second bus 420 in a high impedance state.

Figure 9:
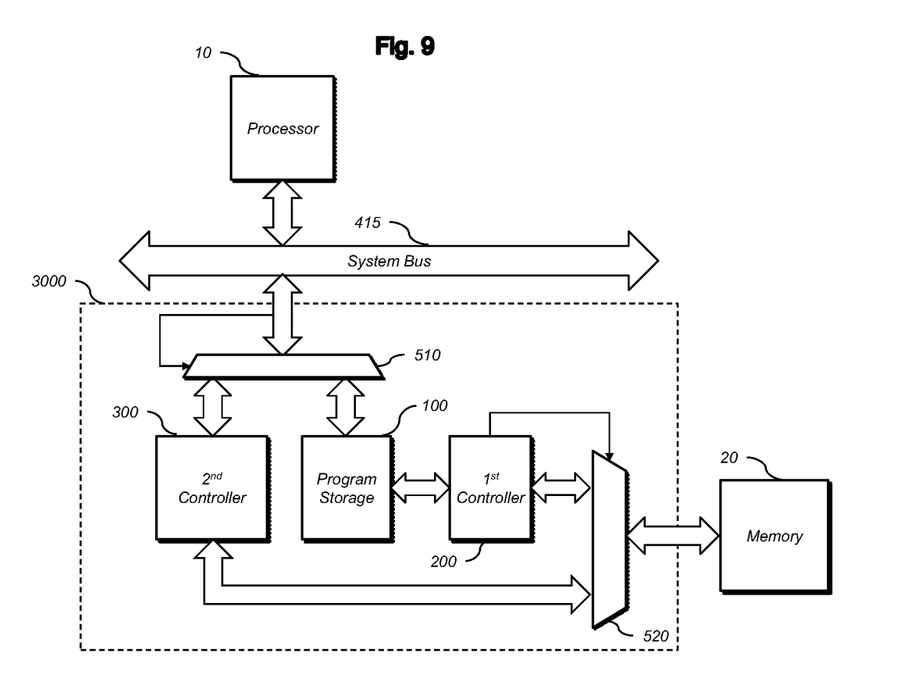
FIG. 9 is a block diagram of a system including a semiconductor device in accordance with an embodiment of the invention.

Referring to FIG. 9, a block diagram of a system including a semiconductor device 3000 is illustrated. FIG. 9 is substantially the same as an embodiment of FIG. 8. FIG. 8 differs from an embodiment of FIG. 8 in that an embodiment of FIG. 9 includes a first selector 510 and a second selector 520 instead of the first bus 410 and the second bus 420, respectively.

The first selector 510 may electrically couple any one of the semiconductor device 3000 and the memory device 20 to a system bus. The first selector 510 may use an address signal transmitted from the system bus as a first select signal to electrically couple the semiconductor device 3000 and the memory device 20 to a system bus.

The second selector 520 may electrically couple any one of the first controller 200 and the second controller 300 to the memory device 20 using a signal. The electrical coupling of the first controller 200 and the second controller 3000 to the memory device may indicate that the first controller 200 is controlling the memory device 20, as a second select signal.

In an embodiment, the second select signal may be easily implemented with a combination of the first select signal and the information on the program code based the control protocol, stored in the program storage 100, by those skilled in the art.

Figure 10:
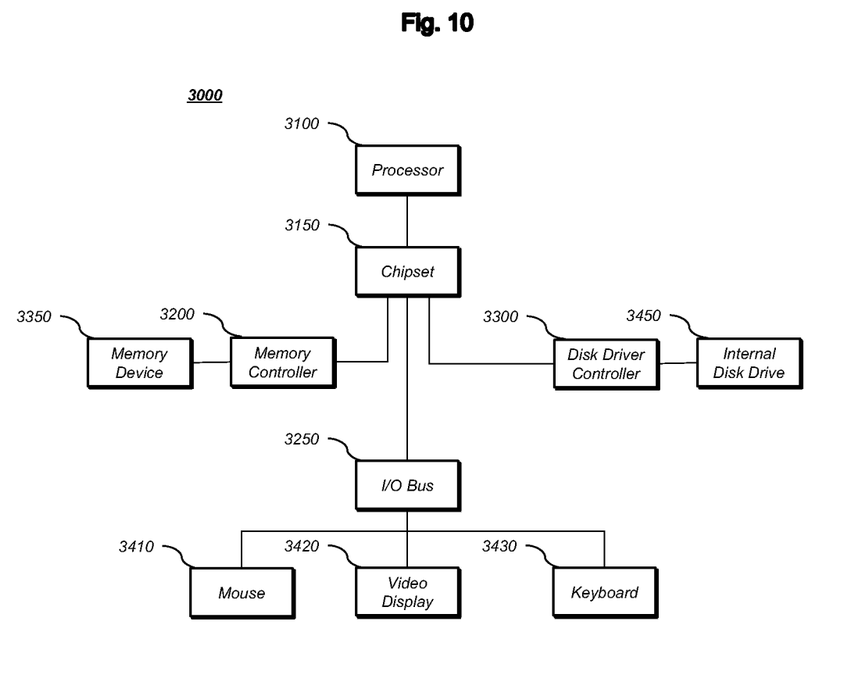
FIG. 10 illustrates a block diagram of a system employing a memory controller circuit in accordance with an embodiment of the invention.

Referring to FIG. 10, a system 3000 may include one or more processors 3100. The processor 3100 may be used individually or in combination with other processors. A chipset 3150 may be electrically coupled to the processor 1100. The chipset 1150 is a communication pathway for signals between the processor 1100 and other components of the system 3000. Other components of the system 3000 may include a memory controller 3200, an input/output ("I/O") bus 3250, and a disk drive controller 3300. Depending on the configuration of the system 3000, any one of a number of different signals may be transmitted through the chipset 3150.

The memory controller 3200 may be electrically coupled to the chipset 3150. The memory controller 3200 can receive a request provided from the processor 3100 through the chipset 3150. The memory controller 3200 may be electrically coupled to one or more memory devices 1350. The memory device 1350 may correspond to the semiconductor device 1000 or 2000 described above.

The chipset 3150 may also be electrically coupled to the I/O bus 3250. The I/O bus 3250 may serve as a communication pathway for signals from the chipset 3150 to I/O devices 3410, 3420 and 3430. The I/O devices 3410, 3420 and 3430 may include a mouse 3410, a video display 3420, or a keyboard 3430. The I/O bus 3250 may employ any one of a number of communications protocols to communicate with the I/O devices 3410, 3420, and 3430.

The disk drive controller 3300 may also be electrically coupled to the chipset 3150. The disk drive controller 3300 may serve as the communication pathway between the chipset 3150 and one or more internal disk drives 3450. The disk drive controller 3300 and the internal disk drive 3450 may communicate with each other or with the chipset 3150 using virtually any type of communication protocol.

In accordance with the embodiments of the invention, the semiconductor device may perform various operations such as test and repair operations on a semiconductor memory device which is mounted in a system. Accordingly, it is possible to improve the reliability of the system through the semiconductor device.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a storage unit configured to store program codes provided through control of a processor core; and
   a control unit configured to perform a control operation on a semiconductor memory device according to the program codes,
   wherein the control unit comprises:
   a function decoder configured to analyze a function to be performed on the semiconductor memory device from the program codes;
   a code controller configured to control a processing order of the program codes according to a control of the function decoder;
   a command generator configured to generate a command to be provided to the semiconductor memory device from the program codes; and
   an address generator configured to generate an address to be provided to the semiconductor memory device.

2. The semiconductor device of claim 1, wherein addresses of a different area from the semiconductor memory device are allocated to the storage unit.

3. The semiconductor device of claim 1, wherein the storage unit comprises:
   a first area for storing the program codes;
   a second area for storing data used in the program codes; and
   a third area for storing data read from the semiconductor memory device.

4. The semiconductor device of claim 1, wherein the program code comprises:
   a first code indicating a start or an end of the control operation on the semiconductor memory device; and
   a second code indicating specific contents of the control operation.

5. The semiconductor device of claim 1, wherein the control unit further comprises:
   a data input/output unit configured to generate first data to be written to the semiconductor memory device or store second data read from the semiconductor memory device according to the control of the function decoder.

6. The semiconductor device of claim 5, wherein the data input/output unit provides the second data to the storage unit.

7. The semiconductor device of claim 1, wherein the control unit further comprises:
   a delay controller configured to delay an operation of the code controller according to the control of the function decoder.

8. The semiconductor device of claim 1, wherein the control unit further comprises:
   a buffer configured to temporarily store a program code read from the storage unit.

9. A semiconductor device comprising:
   a storage unit configured to store program codes provided through control of a processor core;
   a first control unit configured to control a semiconductor memory device according to the program codes; and
   a second control unit configured to control the semiconductor memory device to process a request from the processor core,
   wherein the first control unit comprises:
   a function decoder configured to analyze a function to be performed on the semiconductor memory device from the program codes;

a code controller configured to control a processing order of the program codes according to control of the function decoder;
a command generator configured to generate a command to be provided to the semiconductor memory device from the program codes;
an address generator configured to generate an address to be provided to the semiconductor memory device; and
a data input/output unit configured to generate first data to be written to the semiconductor memory device or store second data read from the semiconductor memory device according to the control of the function decoder.

10. The semiconductor device of claim 9, wherein addresses of a different area from the semiconductor memory device are allocated to the storage unit.

11. The semiconductor device of claim 9, further comprising:
a first bus commonly interfaced to the storage unit and the second control unit to electrically couple the storage unit and the second control unit to the processor core.

12. The semiconductor device of claim 11, further comprising:
a second bus commonly interfaced to the first control unit and the second control unit to electrically couple the first control unit and the second control unit to the semiconductor memory device.

13. The semiconductor device of claim 9, further comprising:
a first selection unit configured to selectively electrically couple the storage unit or the second control unit to the processor core according to the control of the processor core.

14. The semiconductor device of claim 13, further comprising:
a second selection unit configured to selectively electrically couple the first control unit or the second control unit to the semiconductor memory device according to control of the first control unit.

15. The semiconductor device of claim 9, wherein the storage unit comprises:
a first area for storing the program codes;
a second area for storing data used in the program codes; and
a third area for storing data read from the semiconductor memory device.

16. The semiconductor device of claim 9, wherein the first control unit further comprises:
a delay controller configured to delay the operation of the code controller according to the control of the function decoder.

17. The semiconductor device of claim 9, wherein the first control unit is configured to read and to analyze a series of the program codes to determine an operation to be performed by the semiconductor memory device.

* * * * *